(12) United States Patent
Okahisa et al.

(10) Patent No.: US 6,451,478 B1
(45) Date of Patent: Sep. 17, 2002

(54) COIN-SHAPED BATTERY AND METHOD FOR PRODUCING THE SAME

(75) Inventors: Mitsugu Okahisa, Ibaraki; Susumu Yamanaka, Daito; Toshihiko Ikehata, Hirakata; Kaoru Murakami, Hirakata; Masaaki Kaneda, Hirakata; Tetsuya Takeuchi, Yao, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/530,557

(22) PCT Filed: Sep. 1, 1999

(86) PCT No.: PCT/JP99/04751

§ 371 (c)(1),
(2), (4) Date: May 22, 2000

(87) PCT Pub. No.: WO00/13240

PCT Pub. Date: Mar. 9, 2000

(30) Foreign Application Priority Data

| Sep. 1, 1998 | (JP) | 10-246773 |
| Sep. 7, 1998 | (JP) | 10-252407 |
| Nov. 2, 1998 | (JP) | 10-311768 |

(51) Int. Cl.$^7$ ............................................. H01M 10/04
(52) U.S. Cl. ....................................... 429/162; 429/172
(58) Field of Search ................................ 429/163, 164, 429/171, 172, 174, 175, 176, 162; 29/623.2

(56) References Cited

U.S. PATENT DOCUMENTS

| 5,603,157 A | | 2/1997 | Lake et al. |
| 5,662,718 A | * | 9/1997 | Tuttle ........................ 29/623.1 |
| 5,705,294 A | * | 1/1998 | Lake ........................... 429/163 |
| 5,789,104 A | * | 8/1998 | Blonsky et al. ............. 429/164 |

FOREIGN PATENT DOCUMENTS

| JP | 62-184761 | 8/1987 |
| JP | 1040883 | 2/1998 |

* cited by examiner

*Primary Examiner*—Patrick Ryan
*Assistant Examiner*—Monique Wills
(74) *Attorney, Agent, or Firm*—Jordan and Hamburg LLP

(57) ABSTRACT

A gasket-integrated case is obtained by punching out a circular piece from a metal sheet on which a gasket resin film having a round hole is integrally laminated with an adhesive, in such a way as to have a diameter concentric with, but larger than, the round hole, and by drawing the circular piece into a bottomed cylindrical shape. Elements for electromotive force and a sealing plate are then disposed on the case, and the periphery of the sealing plate is sandwiched and sealed by the periphery of the case by crimping, with a gasket including the resin film interposed therebetween, so that a coin-shaped battery is formed. The resin film has a thickness in the range of 20 μm to 150 μm and a modulus of elasticity equal to or greater than 35 kgf/mm$^2$.

21 Claims, 6 Drawing Sheets

COIN-SHAPED BATTERY AND METHOD FOR PRODUCING THE SAME

BACKGROUND

The present invention relates to a coin-shaped battery suitable for power sources and the like in thin electronic devices, and to a method for producing such a coin-shaped battery.

Coin-shaped organic electrolyte batteries comprise elements for electromotive force comprising a positive electrode featuring the use of manganese dioxide or the like, a negative electrode featuring the use of lithium or an alloy thereof, and an electrolyte featuring the use of an organic electrolyte, which are housed in a flat battery case also serving as the positive electrode terminal. A characteristic feature of such coin-shaped batteries is the high energy density resulting from the use of lithium in the negative electrode active material. Such batteries not only allow devices to be made smaller and more light-weight, but are also highly reliable, and are thus used as the main source of power in various types of electronic devices and as memory back up power sources. Particularly in recent years, the ability to make thinner electronic device casings has been accompanied by increasing demand to make thinner coin-shaped batteries, which are housed in such devices. The structure of a conventional coin-shaped battery is described below.

FIG. 12 depicts the cross sectional structure of a coin-shaped organic electrolyte battery in which manganese dioxide is used for the positive electrode and metallic lithium is used for the negative electrode. In the figure, reference numeral 21 is a metal case serving also as the positive electrode terminal; 24 is the positive electrode mix comprising a compression molded mixture of manganese dioxide, graphite, and a binder; 26 is a separator comprising a polypropylene nonwoven fabric; 25 is the negative electrode metallic lithium; 22 is a metal sealing plate generally in the shape of a dish, which also serves as the negative electrode terminal; and 23 is an insulating gasket. There have been studies on making such coin-shaped batteries thinner by changing the shape of the various aforementioned structural components, that is, by making the various structural components thinner.

The aforementioned insulating gasket is generally produced by injection molding, primarily using resins such as polypropylene. To make thinner gaskets by injection molding, it is necessary to reduce the gap through which the resin flows in the mold. However, due to the low fluidity of such resins in molten states, the resin is not sufficiently packed into the more detailed sections of the mold, which can result in resin deficiencies, leading to so-called short shot. In gaskets affected by such short shot, the parts with insufficiently packed resin are thinner than the other parts. As a consequence, coin-shaped batteries using such gaskets are not sealed as well in parts where the case is crimped, resulting in drawbacks such as leakage. The ability to produce thinner gaskets featuring the use of a resin such as polypropylene is thus limited, making it extremely difficult to achieve a thinness of about 0.2 mm or less.

Other problems with thin gaskets formed by injection molding are that the resin shrinks after molding, and that thinner gaskets suffer from inadequate strength, resulting in deformation during transport and battery assembly. Still other problems that occur when gaskets are placed on top of each other are that the gaskets are difficult to pick up during the manufacturing process, resulting in lower productivity.

Thin gaskets thus produced by injection molding suffer from the aforementioned drawbacks. It is thus difficult to make thinner coin-shaped batteries using thinner gaskets, and only coin-shaped batteries that are about 1.2 mm thick can be mass produced.

Furthermore, since the various components forming such thinner coin-shaped batteries are all smaller and thinner, they are more susceptible to breakage and deformation while handled, and must therefore be manually assembled with great care. The gasket 23 which is used to seal the portions where the battery case is sealed by crimping the sealing plate 22 and the battery case 21 or the separator 26 is a thin resin component which tends to deform and is troublesome to handle, thus complicating assembly and acting as a major impediment in the productivity and cost reduction of thin coin-shaped batteries.

In the process disclosed in U.S. Pat. No. 5,603,157 as a means for resolving such drawbacks, a UV curable resin is applied in the form of a thin ring using a screen printing technique to the surface of a thin metal sheet forming the case of the coin-shaped battery, the resin is then irradiated with UV rays and cured, and a disk that has a diameter which is concentric with the aforementioned UV curable resin applied in the form of a ring but which is somewhat larger than the ring-shaped resin is then punched from the electrode case metal sheet coated with the aforementioned UV curable resin and is drawn to produce a coin-shaped battery case with the gasket attached. In this case, extremely high productivity may be anticipated, yet it may also be assumed that it would be difficult to produce a uniform UV curable resin ring of the prescribed thickness consistently in the radial direction, and it may furthermore be assumed that UV curable resins capable of withstanding lithium battery non-aqueous electrolytes are neither currently unavailable for commercial purposes nor likely to be developed in the future.

SUMMARY OF THE INVENTION

An object of the present invention is to improve the structure of a gasket suitable for use in coin-shaped batteries so as to provide a coin-shaped battery with better battery properties and productivity, particularly a coin-shaped battery with a thickness of no more than 1.0 mm, as well as a method for producing such a coin-shaped battery.

In the coin-shaped battery manufacturing process of the present invention, the gasket is supplied to the battery assembly step in the form of an integrated component with the gasket assembled on the battery case, thereby eliminating smaller and thinner parts that are susceptible to deformation from the assembly step, while simultaneously reducing the number of parts that are supplied to the assembly step, reducing the number of assembly steps and the number of steps for controlling parts, as well as using parts with stable shapes that are easy to handle, in an effort to promote the total automation of the assembly step.

To achieve the aforementioned object, the present invention provides a coin-shaped battery comprising elements for electromotive force sealed therein by crimping the periphery of a sealing plate and the internal periphery of a metal case, with a gasket comprising an insulated resin being interposed therebetween, wherein the gasket comprises a resin film formed into a bottomed cylindrical shape with a round hole in the bottom, the aforementioned gasket being crimped while integrated by adhesion to the inside surface of the case. The gasket preferably comprises a resin selected from any of polyphenylene sulfide (PPS), polyethylene naphthalate (PEN), polyethylene terephthalate (PET), and polypropylene (PP).

In the present invention, the resin film preferably ranges in thickness from 20 μm to 150 μm, the adhesive used to integrate the gasket to the inside surface of the case is preferably any of styrene butadiene rubber, butyl rubber, polyolefin, styrene propylene, fluorine, or epoxy adhesives, and the battery preferably ranges in thickness from 0.2 mm to 1.0 mm.

The present invention has greater effect when used as an organic electrolyte battery in which metallic lithium is used as the negative electrode.

Because the gasket is formed by reshaping the resin film into the bottomed cylindrical shape in the present invention described above, it can be made thinner more easily than gaskets obtained by conventional injection molding. In addition, a film having a uniform thickness is used to avoid resin deficiencies that cause short shot during injection molding. Batteries can thus be made thinner to more easily obtain coin-shaped batteries with a thickness of no more than 1.0 mm.

To achieve the aforementioned object, the present invention also provides a coin-shaped battery, wherein elements for electromotive force and a sealing plate are disposed on a gasket-integrated case, the gasket integrated case being obtained by punching a circular piece from a metal sheet on which a gasket resin film having a round hole is integrally laminated with an adhesive, in such a way as to have a diameter concentric with, but larger than, the aforementioned round hole, and by drawing the circular piece into a bottomed cylindrical shape. The periphery of the aforementioned sealing plate is sandwiched and sealed by the periphery of the aforementioned case by crimping, with a gasket made of the aforementioned resin film interposed therebetween.

In a preferred method for producing such a coin-shaped battery, round holes matching the inside diameter of a gasket are punched from a resin film intended to serve as the gasket, with an adhesive previously applied on the side to be brought into contact with a metal sheet; the resin film is then placed on the surface of the metal sheet which has been processed into a case so that the two are laminated by adhesion by means of the adhesive; disks that have a shape concentric with, but larger than, the round holes are then punched from the resin-laminated metal sheet; the disks are then drawn to form gasket-integrated cases; and the gasket-integrated cases are used to produce coin-shaped batteries.

Because this invention allows a case with an integrally laminated gasket to be processed, products (gaskets) which tend to be deformed when handled are avoided, while the number of parts supplied to the assembly process are also reduced, allowing more consistent quality to be achieved and costs to be reduced.

Furthermore, as described above, round holes matching the gasket inside diameter are processed before the resin film is laminated to the metal sheet, so as to eliminate the need for additional processing after the battery case has been completed by drawing the punched disk, as well as to avoid irregular resistance in the battery by doing away with the need to apply an adhesive to the surface of the battery case in contact with the positive electrode mix after the disk has been punched from the resin film, since an adhesive has been provided on the resin film.

An uncured heat-sensitive adhesive may be applied in advance to one surface (the side brought into contact with the metal sheet forming the battery case) of the resin film that is to serve as the gasket. The two parts may be allowed to adhere to each other by being pressed as the adhesive is heated just before the film is laminated to the metal sheet, in order to allow the step for applying the adhesive, where handling the adhesive tends to cause staining, to be managed separately from the battery case processing device, and also to allow the performance of the heat-sensitive adhesive and the like to be controlled separately in advance.

In the present invention, the resin film preferably has a thin layer mainly composed of aluminum on one side, and is preferably caused to adhere to a metal sheet by means of an adhesive applied to the thin layer and/or metal sheet. In a particularly preferred embodiment, the adhesive is mainly composed of a polyolefin resin and has maleic acid-modified functional groups.

This can ensure greater adhesion between the resin film and metal sheet, and thus between the gasket and case.

To achieve the object described above, the present invention also provides a coin-shaped battery comprising elements for electromotive force sealed therein by crimping the periphery of a sealing plate and the internal periphery of a metal case, with a gasket comprising an insulated resin being interposed therebetween, wherein the gasket comprises a resin film formed into a bottomed cylindrical shape with a round hole in the bottom, the aforementioned gasket being integrated by adhesion to the inside surface of the case; and elements for electromotive force and sealing plate are then disposed on the gasket-integrated case, and the periphery of the sealing plate is then sandwiched and sealed by the periphery of the case by crimping, with the gasket interposed therebetween. A preferred embodiment of a method for producing such a coin-shaped battery is a method for producing a coin-shaped battery by providing a sealing plate at the opening of a metal case housing elements for electromotive force, and crimping the plate, with a gasket comprising an insulating resin fitted to the internal periphery of the case, wherein the method comprises the steps of: forming a bottomed cylindrical component by embossing a resin film; forming a round hole in the center of the bottom of the bottomed cylindrical component; punching the bottomed cylindrical component from the resin film to obtain a gasket; and fitting the gasket to a case on which an adhesive has been applied, so as to integrate the gasket and the case.

A means for integrating the aforementioned gasket by adhesion to the inside surface of the case is to use a styrene butadiene rubber, butyl rubber, polyolefin, fluorine, or epoxy adhesive, or to use an asphalt adhesive such as pitch which softens when heated and has adhesion for metals and resins.

The aforementioned embossing process is preferably carried out at a temperature at or beyond the glass transition point of the resin film. The step for punching the bottomed cylindrical component from the resin film to obtain a gasket can be carried out before the gasket is fitted into the case, but can also be carried out at the same time that, or after, the gasket is fitted into the case.

According to the aforementioned invention, a gasket can be formed without using injection molding by forming a portion of a flat resin film into a bottomed cylindrical shape by an embossing process, then punching a round hole in the center of the bottom of the bottomed cylindrical component, and cutting the border line between the flat sheet portion of the resin film and the bottomed cylindrical portion, such as in the aforementioned manufacturing method, for example. This allows a gasket of constant thickness to be produced without resin deficiencies that result when resin is inadequately packed during injection molding, as in conventional examples.

In the aforementioned invention, the gasket preferably has a thin layer mainly composed of aluminum on one side, and is caused to adhere to the case by means of an adhesive applied to the thin layer and/or metal case. In a particularly preferred embodiment, the adhesive is mainly composed of a polyolefin resin and has maleic acid-modified functional groups.

Such a structure overcomes the following problems which can occur when the gasket and case are made to directly adhere to each other. That is, in methods where the case and gasket are allowed to adhere to each other and are integrated by means of an adhesive, inadequate adhesion between the gasket and case can result in displacement of the gasket from the position where it originally adheres as well as in its separation from the case, potentially leading to accidents such as internal shorts and leakage. Such accidents are particularly a problem in batteries featuring the use of organic electrolytes. That is because materials with excellent organic solvent resistance such as polypropylene, polyethylene naphthalate, polyethylene terephthalate, and polyphenylene sulfide are used for the gasket material, making adhesion between the gasket and stainless steel case difficult. In the aforementioned structure of the present invention, such problems are overcome because adhesion is brought about between the metal case and the thin layer mainly composed of aluminum, that is, adhesion is brought about between metals, thereby ensuring that the gasket and case are joined in a firm and stable manner.

BEST MODE FOR CARRYING OUT THE INVENTION

Embodiments of the present invention are described in detail with reference to the examples given below.

Embodiment 1

Figure 1:
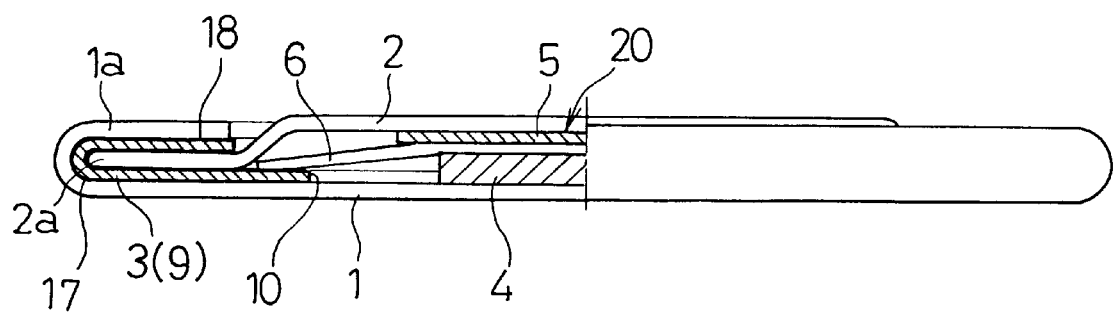
FIG. 1 is a partially cutaway cross section illustrating a coin-shaped battery in Embodiment 1 of the present invention.
Figure 2:
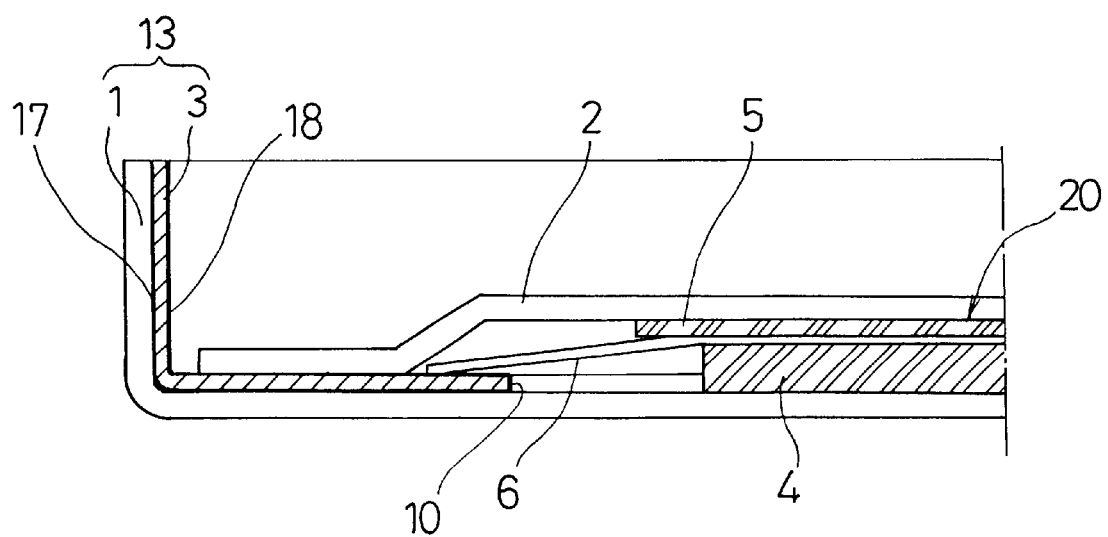
FIG. 2 is a cross section of the main parts before being crimped.

FIGS. 1 and 2 illustrate an organic electrolyte battery in which manganese dioxide is used for the positive electrode and metallic lithium is used for the negative electrode, that is, a coin-shaped battery suitable for use as primary lithium battery.

This embodiment relates to a coin-shaped battery comprising elements for electromotive force 20 that are sealed by crimping the periphery 2a of a sealing plate 2 and the internal periphery 1a of a metal case 1, with a gasket 3 comprising an insulated resin being interposed therebetween. The aforementioned gasket 3 comprises a resin film 9 formed into a bottomed cylindrical shape with a round hole 10 in the bottom, and the aforementioned gasket 3 is crimped while integrated by adhesion to the inside surface of the case 1.

The method for producing such a coin-shaped battery is described with reference to FIGS. 3 through 7 as well as FIGS. 1 and 2.

Figure 3:
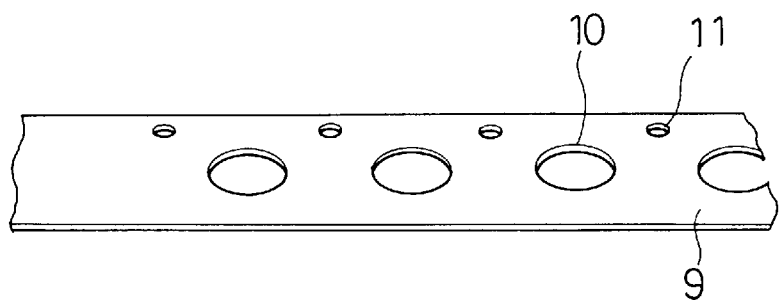
FIG. 3 is a perspective view illustrating the resin film used in Embodiment 1.
Figure 4:
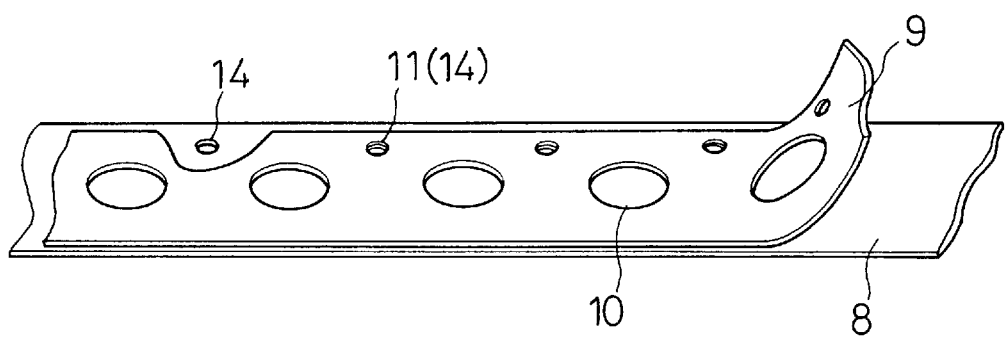
FIG. 4 is a perspective view illustrating the aforementioned resin film and metal sheet adhering to each other.

As illustrated in FIG. 3, pilot pin holes 11 with a diameter of 3 mm and round holes 10 with a diameter of 17 mm matching the gasket inside diameter dimensions are punched at a pitch of 24 mm from a hoop-shaped polyphenylene sulfide (PPS) film 9 that is 75 $\mu$m thick and 25 mm wide. An asphalt adhesive is uniformly applied using a thinning roller onto the surface on one side of the above resin film 9 that is to be laminated to a thin metal sheet (metal sheet) 8. As shown in FIG. 4, a thin stainless steel sheet that is 0.1 mm thick and that has the same hoop width as the aforementioned PPS film is used as the thin metal sheet 8 laminated with the aforementioned PPS film 9. Pilot pin holes 14 with a diameter of 3 mm are pre-formed at a pitch of 24 mm. Pilot pins not shown in the figure are used to align the pilot pin holes 11 and 14, the two aforementioned hoop materials are thereby placed on top of each other so as to obtain the prescribed positional relationships, and the laminated hoop materials are caused to adhere to each other with the application of pressure on both sides while conveyed between the outer periphery of a pair of upper and lower round rollers not shown in the figure, giving a resin-laminated metal sheet.

Figure 5:
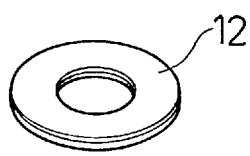
FIG. 5 is a perspective view illustrating a resin-laminated metal disk.
Figure 6:
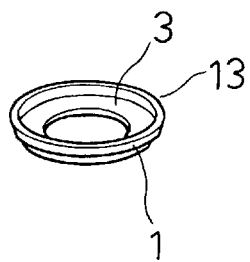
FIG. 6 is a perspective view illustrating the gasket integrated with the case.

Then, as shown in FIG. 5, based on the pilot pin holes 11 and 14, a PPS film-laminated stainless steel disk 12 that has a diameter of 22.5 mm concentric with the round hole 10 matching the gasket inside diameter is punched from the aforementioned PPS film 9. Then, as shown in FIG. 6, the disk can be drawn to produce a cap-shaped work piece 13 having an outside diameter of 20 mm and a height of 1.1 mm comprising an integrated gasket 3 and case 1.

Figure 7:
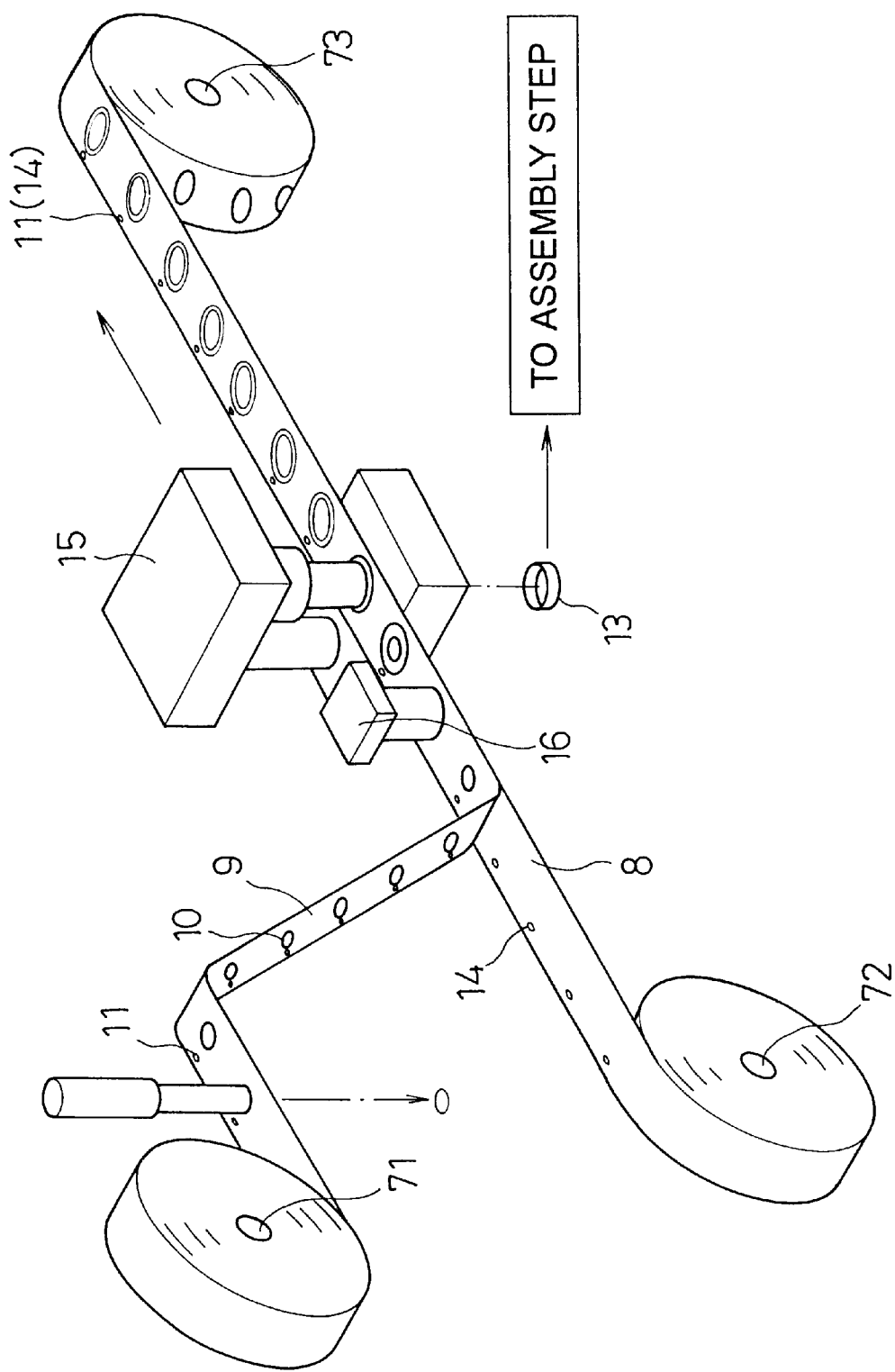
FIG. 7 is a perspective view illustrating a method for producing the gasket-integrated case in Embodiment 1.

FIG. 7 illustrates an example of the device for manufacturing a case used in the aforementioned process. The process using this device comprises the following steps, that is, a first step in which hoops of a thin metal sheet 8 and a resin film 9 of generally the same width are supplied from winding devices 71 and 72, the resin film 9 is provided with round holes 10 and pilot pins holes 11 at the same pitch near the round holes 10 as the sheet and film are conveyed by constant rate feed devices, and the thin metal sheet 8 is provided with pilot pin holes 14 matching the hole diameter and pitch of the aforementioned pilot pin holes 11; a second step in which the surface of the resin film 9 that is to come into contact with the thin metal sheet 8 is coated with an asphalt adhesive in small amounts as a heat-sensitive adhesive sufficient to join the two elements; a third step in which the two elements are aligned based on the pilot pin holes 11 and 14, and are then joined under pressure; and a fourth step in which, based on the aforementioned pilot pin holes 11 and 14, a disk that is concentric with the round hole 10 provided in the resin film 9 but that is larger than the round hole 10 is punched from the thin metal sheet 8 to which the resin film 9 is laminated, and is then drawn. The resulting cap-shaped work piece 13 and waste material or the like taken up by a take-up device 73 are then separately taken from the device.

In the aforementioned third step, the two types of hoop materials 8 and 9 are joined by the pressure of a pair of upper and lower round rollers, but they are also joined by being pressed while heated to within the prescribed temperature range only at the necessary location by a hot press device 16, so as to provide reliable lamination.

In the aforementioned fourth step, a device 15 serving also as a punch is used to continuously carry out along the same axis a disk 12 punching step and a drawing step for forming a bottomed cylindrical shape (cup shape).

In the drawings the width of the hoop materials 8 and 9 is narrow, and the resin-laminated thin metal sheet 12 is punched and drawn in a single row, but such illustration is made only for the purpose of simplifying the depiction. The invention is naturally not limited to processing of a single row. A plurality of processes can be selected as desired according to the production of battery cases so as to easily improve the utilization factor of the materials. The pilot pin holes 11 and 14 are similarly not limited to one per work piece.

In the aforementioned embodiment, a heat-sensitive asphalt adhesive was used to join the resin film 9 and thin metal sheet 8, but other heat-sensitive adhesives may also be used, as well as non-heat-sensitive adhesives. Styrene butadiene rubber adhesives are an example of favorable adhesives other than asphalt adhesives. Butyl rubber, polyolefin, styrene propylene, fluorine, and epoxy adhesives can also be used.

A PPS film 75 $\mu$m thick was used as the aforementioned resin film 9, but PPS films of different thickness, such as 70 $\mu$m, can also be used, as can polypropylene (PP) films, polyethylene naphthalate (PEN) films, polyethylene terephthalate (PET) films, and the like.

An alternative to the aforementioned resin films is resin films that soften when heated and that are adhesive with metals, such as hot melt adhesive resins comprising a polyolefin resin such as polypropylene (PP) which has been modified with maleic acid. Such a resin film and the thin metal sheet can be heated and pressed to allow the resin film and thin metal sheet to be directly joined without using an adhesive.

FIG. 2 shows elements for electromotive force 20 comprising the positive electrode mix 4, negative electrode metallic lithium 5, separator 6, and the like disposed on the work piece obtained in the process described above, that is, the laminated case 13 comprising the integrated gasket 3 and case 1, and the sealing plate 2 furthermore disposed thereon. This can be crimped to obtain a coin-shaped battery in which the periphery of the sealing plate 2 is sandwiched and sealed by the periphery of the case 1, with the gasket 3 comprising the aforementioned resin film 9 interposed therebetween, as shown in FIG. 1. In FIGS. 1 and 2, reference numeral 17 represents the adhesive for integrating the case 1 and gasket 3, and numeral 18 represents an adhesive (sealing agent) for improving the gas-tightness between the gasket 3 and the periphery 2a of the sealing plate 2.

Embodiment 2

Figure 8:
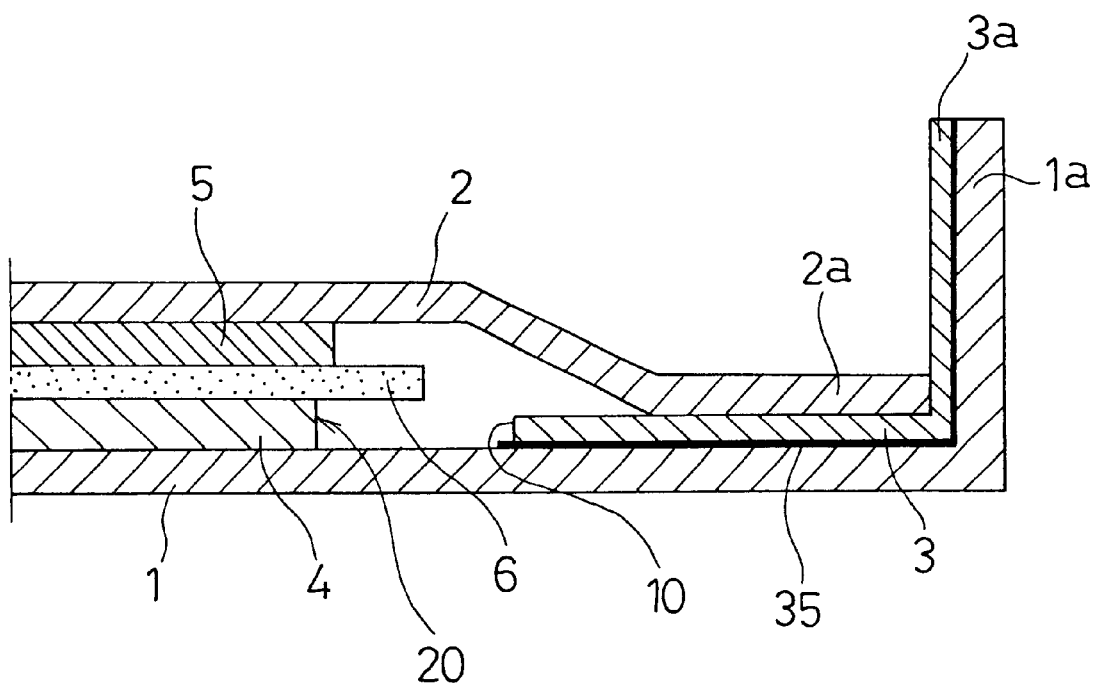
FIG. 8 is a cross section illustrating the main parts of the coin-shaped battery in Embodiment 2 of the present invention before being crimped.

FIG. 8 illustrates the half cross sectional structure of an unsealed manganese dioxide/lithium coin-shaped battery 0.5 mm thick, which has substantially the same structure as in Embodiment 1. In FIG. 8, reference numeral 1 is a 0.1 mm thick case also serving as a positive electrode terminal made of a metal such as stainless steel; 4 is a 0.18 mm thick positive electrode mix comprising a compression molded mixture of manganese dioxide, graphite, and a binder; 6 is a 0.03 mm thick separator comprising a porous sheet of polypropylene; 5 is 0.06 mm thick metallic lithium for the negative electrode; 2 is a 0.1 mm thick sealing plate also serving as the negative electrode terminal, which is made of a metal such as stainless steel and is generally in the shape of a dish; and 3 is a 0.07 mm thick gasket comprising an undrawn polypropylene film with an elastic modulus of 35 kgf/mm². An organic electrolyte is used. A gasket made of a resin film with a low elastic modulus is susceptible to deformation and has an adverse effect on the dimensional precision during molding. A resin film with an elastic modulus of 35 kgf/mm² is thus used in this embodiment.

The aforementioned gasket 3 is obtained by forming a bottomed cylindrical shape by an embossing process in which the film is sandwiched between molds at about 130° C. (a temperature below the film melting point but at or beyond the glass transition point), and by punching out a portion of the bottom to form a round hole 10, and finally by punching the film along the upper periphery 3a of the bottomed cylindrical component.

Figure 9:
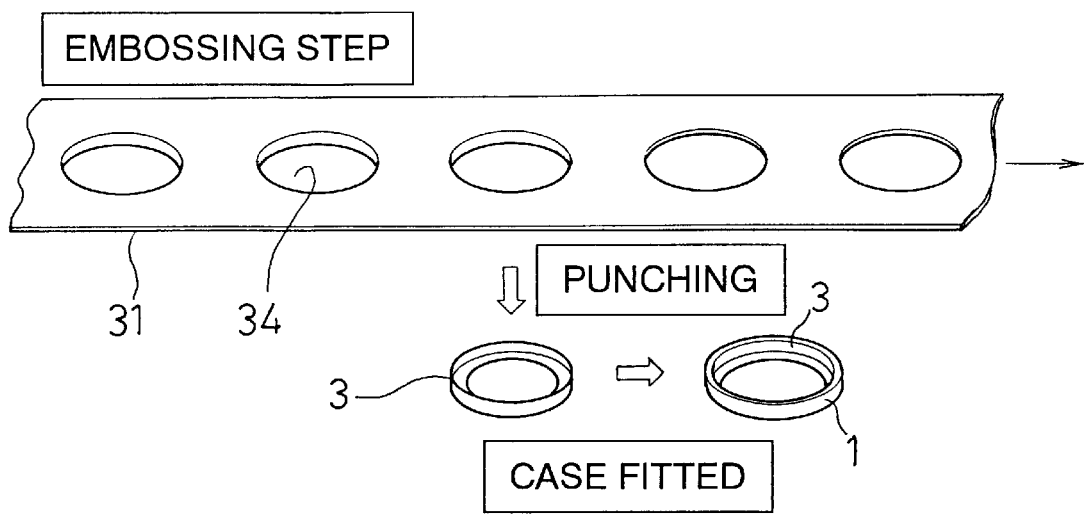
FIG. 9 is a perspective view illustrating a method for producing the gasket in Embodiment 2.
Figure 10:
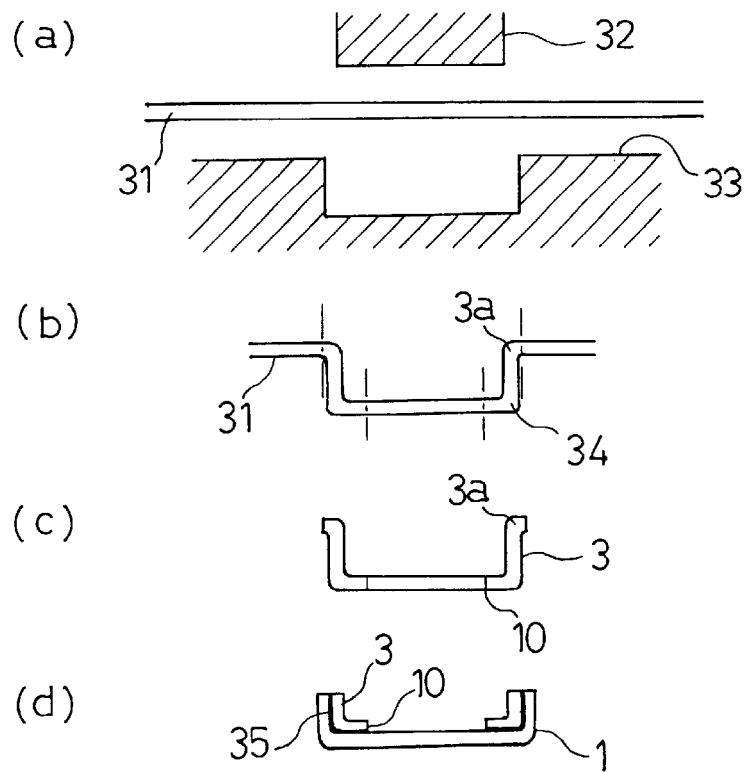
FIGS. 10(a) through (d) illustrate the steps for manufacturing the gasket and the steps for fitting the gasket to the case.

FIGS. 9 and 10 illustrate the manufacture of the aforementioned gasket 3 and the assembly of the gasket 3 on the case 1. The resin film 31 comprising a hoop of undrawn polypropylene is pressed between upper and lower molds 32 and 33, as shown in FIG. 10(a), while heated using the molds 32 and 33 to form a bottomed cylindrical component 34. The heating temperature at this time should be at or beyond the glass transition point of the resin film 31. Then, as shown in FIG. 10(b), the bottomed cylindrical component 34 is punched from the resin film 31 along the upper periphery 3a using a punch, and a round hole 10 is punched in the center of the bottom to obtain a gasket 3 as shown in FIG. 10(c). As shown in FIG. 10(d), the gasket 3 is manually or automatically fitted (including charging) to, and integrated, with the case 1 coated with an asphalt adhesive (pitch) 35.

In the aforementioned case depicted in FIG. 10, the gasket 3 was punched from the resin film 31 and then fitted into the case 1, but the bottomed cylindrical component 34 may also be punched from the resin film 31 along the upper periphery 3a after being fitted into the case 1 to form a case 1 with a gasket 3 fitted and joined thereto. In this case, the gasket 3 is easily punched from the thin, readily deformable resin film 31. In the aforementioned case, the gasket 3 was punched using a mold, but the gasket 3 may also be cut from the resin film 31 using a laser cutting device or the like. The position where the gasket 3 is cut may be established so that the top end of the gasket 3 protrudes slightly above (0.05 to 0.15 mm, for example) the top end of the case 1.

As described above, the gasket 3 comprises a resin film 31 formed by embossing into a bottomed cylindrical shape with a round hole 10 in the bottom, and is integrated by adhesion to the inner surface of the aforementioned case 1. After that, elements for electromotive force 20 comprising a positive electrode mix 4, negative electrode metallic lithium 5, separator 6, and the like are subsequently disposed on the gasket-integrated case 1, and a sealing plate 2 is then furthermore disposed thereon, resulting in the state depicted in FIG. 8. A coin-shaped battery is then obtained, wherein the periphery 2a of the aforementioned sealing plate 2 is sandwiched and sealed by the periphery 1a of the aforementioned case 1 when crimped, with the gasket 3 interposed therebetween. This configuration is substantially the same as that in FIG. 1.

A Cell A was prepared in the aforementioned manner. As a comparative example, a Cell B was assembled using a gasket prepared by injection molding into the same shape as the gasket in Cell A. The structure other than the gasket in Cell B was the same as in Cell A.

One thousand units each of the aforementioned Cells A and B were produced, and the properties were then tested. The open circuit voltage immediately after the cells were assembled and the leak resistance (where 1 cycle was a 4 hour −10° C. to +60° C. heat cycle) were checked in these tests. The values were for 500 cells each. The results are given in Table 1.

TABLE 1

|  | Open circuit voltage (V) | Number of leak resistant cells |
|---|---|---|
| Cell A (present invention) | Mean voltage = 3.35 Standard deviation = 0.002 | 0/500 |
| Cell B (comparative example) | Mean voltage = 3.06 Standard deviation = 0.020 | 55/500 |

Table 1 shows that the product of the present invention (Cell A) had an open circuit voltage and leak resistance equal to conventional coin-shaped batteries. The comparative example (Cell B), on the other hand, had a lower open circuit voltage and also leaked. The causes were attributed to resin deficiencies due to insufficiently packed resin, where short circuits and leakage occurred.

The results show that the gasket in Cell A was excellent for producing a coin-shaped organic electrolyte battery of 1 mm thickness or less.

A Cell C was then produced, which was the same as Cell A except that the gasket film comprised an undrawn polypropylene film with an elastic modulus of 40 kgf/mm$^2$, and the manner of assembling the gasket was different from that of Cell A.

The gasket in Cell C was assembled by forming the film into a bottomed cylinder, then punching part of the bottom to form a round hole, and finally punching the gasket from the film, while at the same time pushing up the case in the direction opposite the punching direction to integrally fit the gasket to the case.

Five hundreds units of Cell C were prepared, and the properties were then tested. The open circuit voltage immediately after the cells were assembled and the leak resistance (where 1 cycle was a 4 hour −10° C. to +60° C. heat cycle) were checked in these tests. The values were for 500 cells. The results are given in Table 2.

TABLE 2

|  | Open circuit voltage (V) | Number of leak resistant cells |
|---|---|---|
| Cell C (present invention) | Mean voltage = 3.35 Standard deviation = 0.002 | 0/500 |

Cell C had an open circuit voltage and leak resistance equal to conventional coin-shaped batteries.

The results show that a coin-shaped organic electrolyte battery with a thickness of no more than 1 mm could be efficiently manufactured by forming a film with an elastic modulus of 40 kgf/mm$^2$ into a bottomed cylindrical shape, then punching a portion of the bottom into a round hole, and finally punching the resulting gasket from the film, while at the same time pushing up the case in the direction opposite the punching direction to integrally fit the gasket to the case, thereby incorporating the gasket.

Polypropylene was used as the resin film in this embodiment, but PPS, PEN, PET, or polyesters may also be used in the same manner as in Embodiment 1.

Embodiment 3

Figure 11:
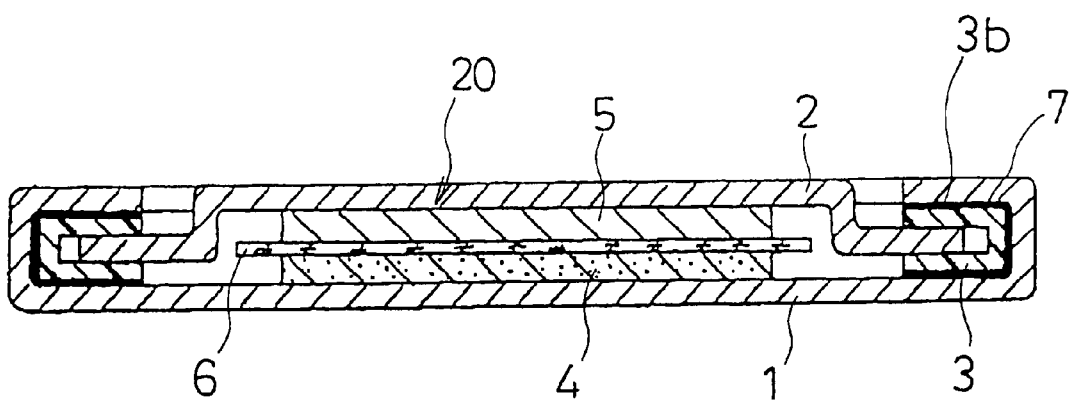
FIG. 11 is a cross section illustrating the coin-shaped battery in Embodiment 3 of the present invention.
Figure 12:
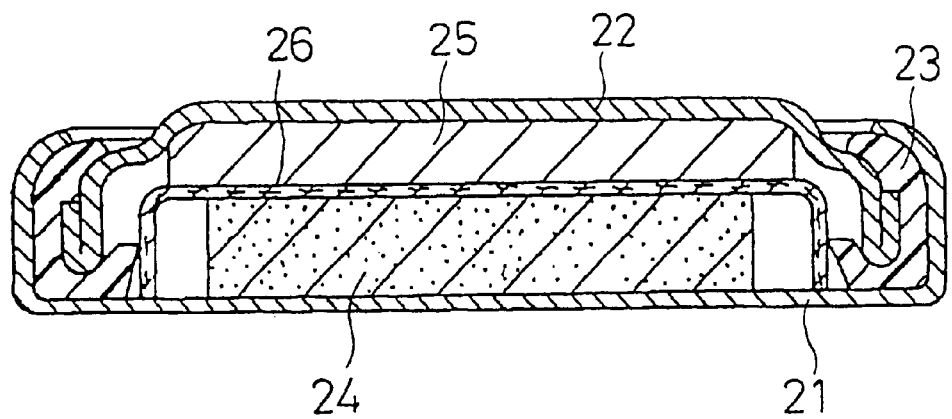
FIG. 12 is a cross section illustrating a conventional coin-shaped battery.

FIG. 11 is a cross section of the coin-shaped organic electrolyte battery in the present embodiment. In FIG. 11, the case 1 also serving as the positive electrode terminal is made of stainless steel with excellent corrosion resistance. The periphery of the sealing plate 2 also serving as the negative electrode terminal is flat, and the exterior has a protruding hat-shaped structure. The material is the same as that of the case 1. The PPS gasket 3 comprises a 60 μm thick PPS resin, with a thin layer 7 formed on the outside surface 3b. In this embodiment, an approximately 1 μm thick aluminum layer (thin layer mainly composed of aluminum) is formed by vacuum aluminum deposition as the thin layer 7. After the formation of the aluminum layer 7, the PPS resin film is punched into a donut shape with an outside diameter greater than the inside diameter of the case 1. The film is fitted into the case 1, so that the aluminum layer 7 of the gasket 3 is in contact with the adhesive applied to the case 1, where a polyolefin-based modified adhesive has been applied on the outside surface and the edges of the internal peripheral surface. The adhesive is dried for 30 seconds at 120° C. to integrate the case 1 and the gasket 3. Hardren, trademark by Toyo Kasei Kogyo, was used as the polyolefin-based modified adhesive.

The positive electrode mix 4 of the power generating elements 20 comprises a mixture of manganese dioxide, carbon black serving as the conductor, and a fluororesin powder serving as the binder. The mixture is compression molded into a pellet 15 mm in diameter and 0.3 mm thick, and is then dried for 12 hours at 200° C. The negative electrode comprises metallic lithium 5, comprising a hoop of metallic lithium which has been punched into a circle and then bonded by pressure to the convex internal surface of the sealing plate 2. The separator 6 comprises a polypropylene non-woven fabric which holds the electrolyte. The electrolyte comprises lithium perchlorate dissolved in a proportion of 1 mol/L in a solvent mixture of equal volumes of propylene carbonate and 1,2-dimethoxyethane.

The power generating elements 20 comprising the positive electrode mix 4, negative electrode metallic lithium 5, and separator 6 are housed in the case 1, the gasket 3 and sealing plate 2 are disposed thereon, and the edge of the case 1 is folded back inward to crimp the battery. An asphalt-based sealing agent (adhesive) is previously applied to the surface at which the gasket 3 and sealing plate 2 come into contact.

In this embodiment, manganese dioxide was used as the positive electrode active material, but polyfluorocarbon, thionyl chloride, sulfur dioxide, silver chromate, and the like may similarly be used. The effects of the present invention will not be compromised by modifications of the separator, electrolyte, active mix including the negative electrode, or the like. Although not given in the present embodiment, the invention is also suitable for rechargeable secondary batteries in which the negative electrode may feature the use of lithium alloys capable of occluding and releasing metallic lithium or lithium, carbon, metal oxides, and polyacene, the electrolyte may feature the use of organic electrolytes, and the positive electrode may feature the use of materials forming lithium ions and intercalation compounds, such as vanadium pentoxide, niobium pentoxide, manganese dioxide, and similar metal oxides, or compound oxides of lithium and metal oxides, and sulfur compounds such as titanium disulfide and molybdenum disulfide, as well as conductive polymers such as polyaniline and polyacene.

The technique for forming an aluminum-based thin layer on one surface of the resin film, and joining the resin film to the metal sheet by means of an adhesive applied on the thin layer and/or metal sheet (stainless steel sheet) can also be used to join the resin film 9 and thin metal sheet 8 in Embodiment 1 or the gasket 3 and case 1 in Embodiment 2.

The present invention provides a thinner coin-shaped battery of no more than 1.0 mm with an improved gasket structure suitable for such coin-shaped batteries. The present invention is thus particularly useful for designing thinner coin-shaped batteries without compromising the battery properties or mass producibility.

What is claimed is:

1. A coin-shaped battery comprising:
    a case having an internal periphery;
    a sealing plate having a periphery;
    a gasket fixed to the internal periphery of said case, wherein said gasket has a cylindrical shape and a bottom with a round hole in said bottom;
    said gasket including a resin film;
    said resin film having a thickness in the range of 20 $\mu$m to 150 $\mu$m and a modulus of elasticity equal to or greater than 35 kgf/mm$^2$; and
    elements for producing electromotive force sealed within said case by crimping the internal periphery of said case and the gasket to the periphery of said sealing plate.

2. The coin-shaped battery according to claim 1, wherein said gasket is made of a resin selected from a group consisting of polyphenylene sulfide, polyethylene naphthalate, polyethylene terephthalate, and undrawn polypropylene.

3. The coin-shaped battery according to claim 1 or 2, wherein said gasket is fixed to said internal periphery of said case by an adhesive selected from a group consisting of styrene butadiene rubber, butyl rubber, polyolefin, styrene propylene, fluorine, and epoxy adhesives.

4. The coin-shaped battery according to claim 1 or 2, wherein said coin-shaped battery has a thickness of 0.2 mm to 1.0 mm.

5. The coin-shaped battery according to claim 1 or 2, wherein said coin-shaped battery is an organic electrolyte battery having a metallic lithium negative electrode.

6. A coin-shaped battery comprising:
    elements for producing electromotive force;
    a gasket-integrated case including a gasket;
    a sealing plate disposed on said gasket-integrated case;
    said gasket-integrated case being obtained by punching a circular piece from a metal sheet on which a resin film, having a round hole, is integrally laminated with an adhesive, over an area having a diameter concentric with, but larger than, said round hole, and by drawing said circular piece into a bottomed cylindrical shape; and
    said resin film having a thickness in the range of 20 $\mu$m to 150 $\mu$m and a modulus of elasticity equal to or greater than 35 kgf/mm$^2$;
    wherein a periphery of said sealing plate is sandwiched and sealed by a periphery of said gasket-integrated case by crimping the gasket-integrated case, with the gasket formed by said resin film disposed between said sealing plate and said gasket-integrated case.

7. A coin-shaped battery comprising:
    elements for producing electromotive force;
    a gasket-integrated case including a gasket;
    a sealing plate disposed on said gasket-integrated case; and
    said gasket-integrated case being obtained by punching a circular piece from a metal sheet on which a resin film, having a round hole, is integrally laminated with an adhesive, over an area having a diameter concentric with, but larger than, said round hole, and by drawing said circular piece into a bottomed cylindrical shape, wherein a periphery of said sealing plate is sandwiched and sealed by a periphery of said gasket-integrated case by crimping the gasket-integrated case, with the gasket formed by said resin film disposed between said sealing plate and said gasket-integrated case, and said resin film has a thin layer, composed substantially of aluminum on a side of said resin film fixed to said metal sheet by means of an adhesive applied to the thin layer and/or the metal sheet.

8. The coin-shaped battery according to claim 7, wherein said adhesive is composed substantially of a polyolefin resin and has maleic acid-modified functional groups.

9. A method fo[00f8] producing coin-shape[0084] batteries, comprising the steps of:
    preparing a resin film, said resin film having a thickness in the range of 20 $\mu$m to 150 $\mu$m and a modulus of elasticity equal to or greater than 35 kgf/mm$^2$;
    applying an adhesive to one side of the resin film to be formed into gaskets;
    punching round holes matching an inside diameter of said gaskets, in said resin film;
    placing said resin film on a metal sheet, to be formed into cases so that said adhesive is positioned between said resin film and said metal sheet;
    activating said adhesive so as to produce a resin-laminated metal sheet;
    punching disks having a shape concentric with, but larger than, said round holes, from said resin-laminated metal sheet;
    drawing said disks to form gasket-integrated cases; and
    producing coin-shaped batteries using said gasket-integrated cases.

10. A coin-shaped battery comprising:
    a case having an internal periphery;
    a gasket including a resin film;
    said resin film having a thickness in the range of 20 $\mu$m to 150 $\mu$m and a modulus of elasticity equal to or greater than 35 kgf/mm$^2$;
    a sealing plate having a periphery;
    elements for producing electromotive force sealed within said case by crimping the internal periphery of said case and said gasket so that said gasket is disposed between said sealing plate and said case; and
    said gasket having a cylindrical shape and a bottom with a round hole, wherein said gasket is fixed to said internal periphery of said case, so as to produce a gasket-integrated case, and said elements for producing electromotive force and said sealing plate are disposed on said gasket-integrated case, and said periphery of said sealing plate is sandwiched and sealed by said periphery of said gasket-integrated case.

11. A coin-shaped battery comprising:

a case having an internal periphery;

a gasket including a resin film;

a sealing plate having a periphery;

elements for producing electromotive force sealed within said case by crimping the internal periphery of said case and said gasket so that said gasket is disposed between said sealing plate and said case; and said gasket having a cylindrical shape and a bottom with a round hole, wherein said gasket is fixed to said internal periphery of said case, so as to produce a gasket-integrated case, and said elements for producing electromotive force and said sealing plate are disposed on said gasket-integrated case, and said periphery of said sealing plate is sandwiched and sealed by said periphery of said gasket-integrated case, and said gasket has a thin layer, composed substantially of aluminum on one side of said gasket, fixed to said case with adhesive applied to the thin layer and/or the case.

12. The coin-shaped battery according to claim 11, wherein said adhesive is composed substantially of a polyolefin resin and has maleic acid-modified functional groups.

13. A method for producing a coin-shaped battery, including an open end of a case crimped to sandwich a sealing plate, said case housing elements for producing electromotive force, with a gasket made of a resin fitted to an internal periphery of said case, comprising the steps of:

forming a cylindrical component, with a bottom, by embossing a resin film;

forming a round hole in a center of said bottom;

punching said cylindrical component from said resin film to obtain a gasket; and fitting said gasket into a case on which an adhesive has been applied, so as to integrate said gasket and said case, wherein said gasket has a thickness in the range of 20 $\mu$m to 150 $\mu$m and a modulus of elasticity equal to or greater than 35 kgf/mm$^2$.

14. The method for producing a coin-shaped battery according to claim 13, wherein said embossing is carried out at a temperature equal to or greater than a glass transition point of said resin film.

15. The method for producing a coin-shaped battery according to claim 13, wherein said punching is carried out prior to said gasket being fitted into said case.

16. The method for producing a coin-shaped battery according to claim 13, wherein said punching is carried out at the same time as said gasket being fitted into said case.

17. The method for producing a coin-shaped battery according to claim 13, wherein said punching is carried out after said gasket is fitted into said case.

18. The coin shaped battery according to claim 7, wherein said resin film has a thickness in the range of 20 $\mu$m to 150 $\mu$m and a modulus of elasticity equal to or greater than 35 kgf/mm$^2$.

19. The coin shaped battery according to claim 8, wherein said resin film has a thickness in the range of 20 $\mu$m to 150 $\mu$m and a modulus of elasticity equal to or greater than 35 kgf/mm$^2$.

20. The coin shaped battery according to claim 11, wherein said resin film has a thickness in the range of 20 $\mu$m to 150 $\mu$m and a modulus of elasticity equal to or greater than 35 kgf/mm$^2$.

21. The coin shaped battery according to claim 12, wherein film has a thickness in the range of 20 $\mu$m to 150 $\mu$m and a modulus of equal to or greater than 35 kgf/mm$^2$.

* * * * *